United States Patent
Lai et al.

(10) Patent No.: US 6,500,275 B1
(45) Date of Patent: Dec. 31, 2002

(54) MITIGATION OF SPACECRAFT CHARGING BY MEANS OF POLAR MOLECULES

(75) Inventors: Shu T. Lai, Burlington, MA (US); Edmond Murad, Newton, MA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 144 days.

(21) Appl. No.: 09/592,508

(22) Filed: Jun. 12, 2000

(51) Int. Cl.$^7$ .............................. B08B 3/00; B08B 7/04
(52) U.S. Cl. ............................ 134/42; 134/34; 134/37; 244/1 A; 136/292
(58) Field of Search .................. 134/1, 34, 37, 134/42; 244/1 A; 136/243, 244, 292

(56) References Cited

U.S. PATENT DOCUMENTS 4,836,860 A * 6/1989 Bianchi ..................... 134/1
4,846,425 A * 7/1989 Champetier .................. 134/1
4,898,347 A * 2/1990 Bianchi ....................... 134/21
5,628,831 A * 5/1997 Williamson et al. ......... 134/1.1

* cited by examiner

Primary Examiner—Frankie L. Stinson
Assistant Examiner—Saeed Chaudhry
(74) Attorney, Agent, or Firm—William G. Auton

(57) ABSTRACT

The process of mitigation of spacecraft surface charging using polar molecules is invented. There exists a class of polar molecules which are electro-negative. This class includes the halocarbons, and includes the fluorocarbon refrigerants. They readily pick up electrons and become negatively charged molecules. In this invention, neutral polar molecular liquid is sprayed in fine mist form onto negatively charged spacecraft surfaces. The molecules pick up the electrons and evaporate away with the electrons.

2 Claims, 2 Drawing Sheets

FIG. 1

TOWER, 210

ARM, 220

SPRAYER, 230

SURFACE, 200

SPACECRAFT

FIG. 2

MITIGATION OF SPACECRAFT CHARGING BY MEANS OF POLAR MOLECULES

STATEMENT OF GOVERNMENT INTEREST

The invention described herein may be manufactured and used by or for the Government for governmental purposes without the payment of any royalty thereon.

BACKGROUND OF THE INVENTION

The invention relates generally to systems for protecting spacecraft from hazardous space plasma environment, and more specifically it relates to a new kind of system for the mitigation of spacecraft surface charging using polar molecules. There exists a class of polar molecules which are electro-negative. This class includes the halocarbons, and includes the fluorocarbon refrigerants. They readily pick up electrons and become negatively charged molecules. In this invention, neutral polar molecular liquid is sprayed in fine mist form onto negatively charged spacecraft surfaces. The molecules pick up the electrons and evaporate away with the electrons.

Charging of spacecraft in the space plasma environment may be hazardous to the health of on-board electronics. It may affect telemetry, navigation, operations, and even the survivability of spacecraft, and degrade scientific measurements. Spacecraft charging may be due to natural or artificial causes. Natural charging is due to the interaction between a spacecraft and its space plasma environment. Artificial charging is due to beam emissions, for example. In the geosynchronous environment, a spacecraft is often charged negatively during eclipse.

The task of providing spacecraft charging protection using technology is alleviated by the following U.S. Patents, the disclosures of which are incorporated herein by reference:

U.S. Pat. No. 5,594,325 issued to David Manner;
U.S. Pat. No. 4,691,159 issued to Ahrens et al.;
U.S. Pat. No. 4,899,269 issued to Rouzies;
U.S. Pat. No. 5,394,075 issued to Ahrens et al.;
U.S. Pat. No. 5,444,358 issued to Delepaunt;
U.S. Pat. No. 5,451,858 issued to Van Duyne et al.

The above-cited references describe patented space radiation protection systems. The Manner patent describes the use of spacecraft power systems to mitigate spacecraft charging effects. Geosynchronous spacecraft have a history of charging anomalies. Conventional passive protection measures are often complex and costly.

SUMMARY OF THE INVENTION

The present invention is a system for mitigating spacecraft charging by means of polar molecules. A polar molecule is a molecule possessing a permanent electric dipole moment. Molecules containing atoms of more than one element are polar except where forbidden by symmetry; molecules formed from atoms of a single element are nonpolar.

The present invention is based on the theory that the positive ions returning to the spacecraft neutralize the excessive negative surface charge and the electrons leaving from the spacecraft carry away negative charge. Using ions or electrons alone would cause differential charging, meaning different surfaces attaining different charging levels. On one embodiment of the invention a polar molecule liquid is stored in a container. A heating coil is inside. The heater coil is capable of heating the liquid to temperatures near boiling. The liquid flows along a tube through a control knob to atomizer sprayer, which is mounted on a movable arm on a tower. The lengths of the towers and arms equal the radius of the spacecraft approximately.

To operate the device, the movable arm moves into a desired position to aim the polar liquid vapor/droplet spray onto a charged spacecraft surface. The vapor/droplets are neutral initially. There the droplets act as electron scavengers and become negatively charged droplets. As they evaporate to small sizes, they eventually burst into smaller droplets taking the electrons away.

The control knob can be switched on or off by a remote command from the ground. When the negative charging level of the spacecraft or a spacecraft surface reaches a certain level, the ground command can optionally turn the mitigation device on. When the level falls to a certain level, the ground command can optionally turn the mitigation device off. Alternatively, it can be turned on or off automatically by linking it to a charge sensor. When the sensor senses a critical charging level, it can send a command to turn on or off the device automatically.

DESCRIPTION OF THE DRAWINGS

FIG. 1 illustrates the elements of the invention.
FIG. 2 illustrates the operation of the invention.

DETAILED DESCRIPTION OF THE PREFERRED EMBODIMENT

Figure 1:
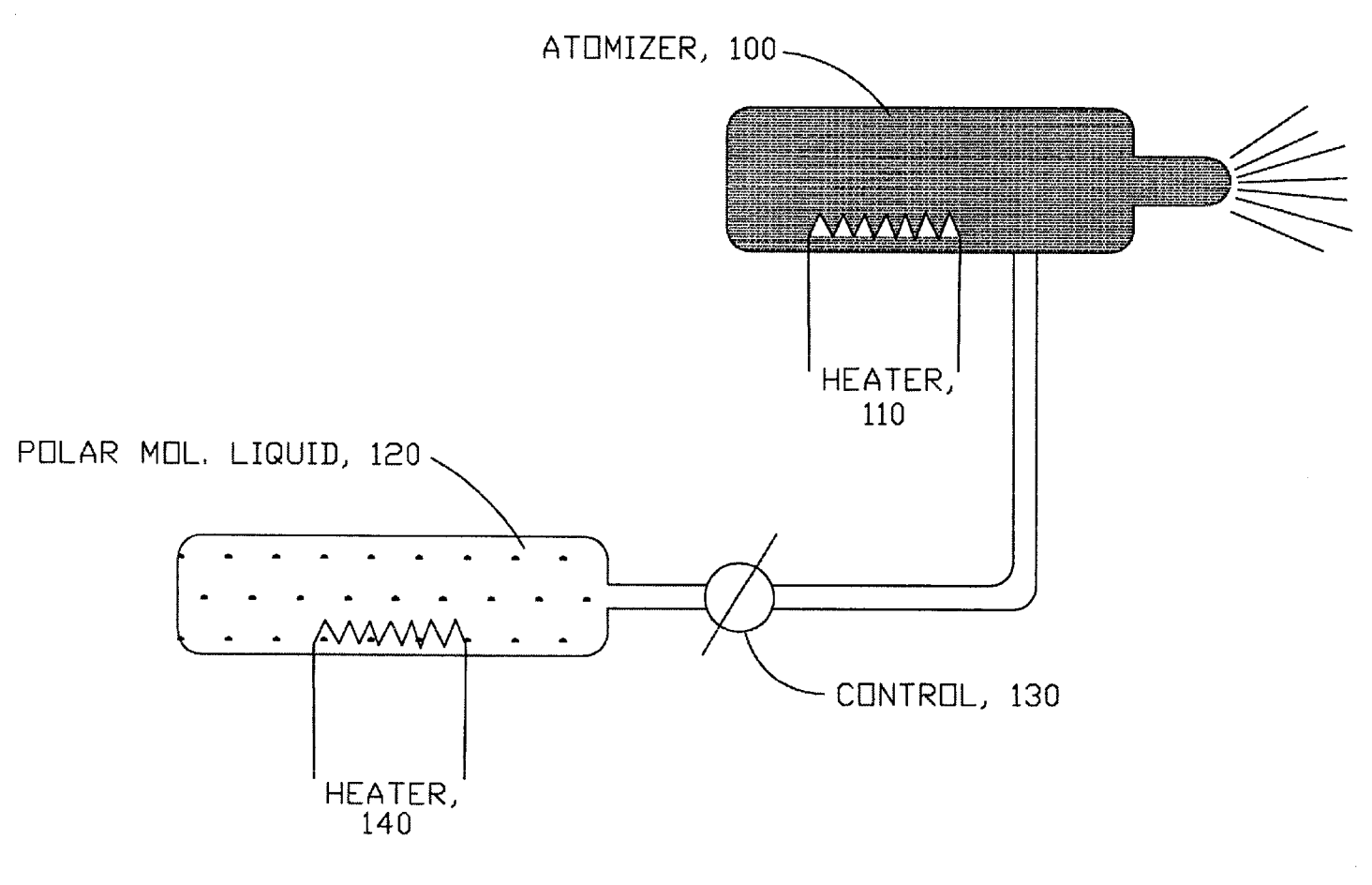

Referring to FIG. 1 of the drawings, there is shown a pictorial representation of the basic elements of the invention. the device is for mitigating spacecraft surface charge. It consists of a heated polar molecular liquid tank, a control knob, and a heated atomizer/sprayer.

As mentioned above, adverse space weather affects space systems. It has been established that spacecraft surface charging to negative potentials occurs during highly disturbed space conditions, and, in particular, spacecraft surface charging is often harmful to the health of the electronics onboard. Active methods for mitigating spacecraft surface charging are desirable because the on/off and the appropriate level of the mitigation process can be controlled on the ground as necessary. A charging mitigation experiment has been conducted on the SCATHA (Spacecraft Charging at High Altitudes) satellite, which was launched by the Air Force for dedicated studies on spacecraft charging. The results indicated that xenon plasma (mixed electrons and xenon ions) emission form the spacecraft was more effective than emissions of electrons or ions alone for mitigation of charging. The current theory for the mitigation mechanism is that the positive ions returning to the spacecraft neutralize the excessive negative surface charge and the electrons leaving from the spacecraft carry away negative charge. Using ions or electrons alone would cause differential charging, meaning different surfaces attaining different charging levels.

A recent mitigation experiment was conducted on a DSCS (Defense Systems Communications Satellite) satellite. Xenon plasma was emitted on command. The results confirmed that the mitigation method was effective in lowering the charging level substantially. However, the mitigation on DSCS was incomplete at times. Incomplete mitigation could be due to insufficient positive xenon ions emitted.

Previously, we proposed using water and polar molecules to mitigate spacecraft surface charging. The discussion was mainly on the physics of water evaporating from negatively charged spacecraft surfaces and explained how evaporation carries away excess surface electrons. Besides water, two polar molecules, $CCl_4$ and $SF_6$, were mentioned. No explicit mitigation device or operation was proposed.

There exists a whole class of polar molecules which are good electron scavengers. This class of molecules pick up electrons and become electro-negative molecules. In the present invention, we propose using this class of polar molecules to mitigate negative spacecraft charging. This class of polar molecules include $CCl_4$, $SF_6$, halocarbons such as $C_2HCl_3$ and $C_2H_4Cl_2$, and the fluorocarbons commonly used as refrigerants such as $C_2HCl_3F_2$. These molecules pick up electrons readily.

The behavior of charged liquids is expected to follow the classical Rayleigh law. When the evaporating charged droplet radius diminishes to a critical Rayleigh size, the droplet would burst into several smaller droplets and electrons are carried away by the smaller droplets. The Rayleigh size is given by the balance of the electrostatic repulsion of the droplet charges and the surface tension of the droplet surface. In the low atmospheric pressure (practically vacuum) space environment, neutral and charged water droplets on the spacecraft surface evaporate rapidly, especially on the sunlit side of spacecraft.

Figure 2:
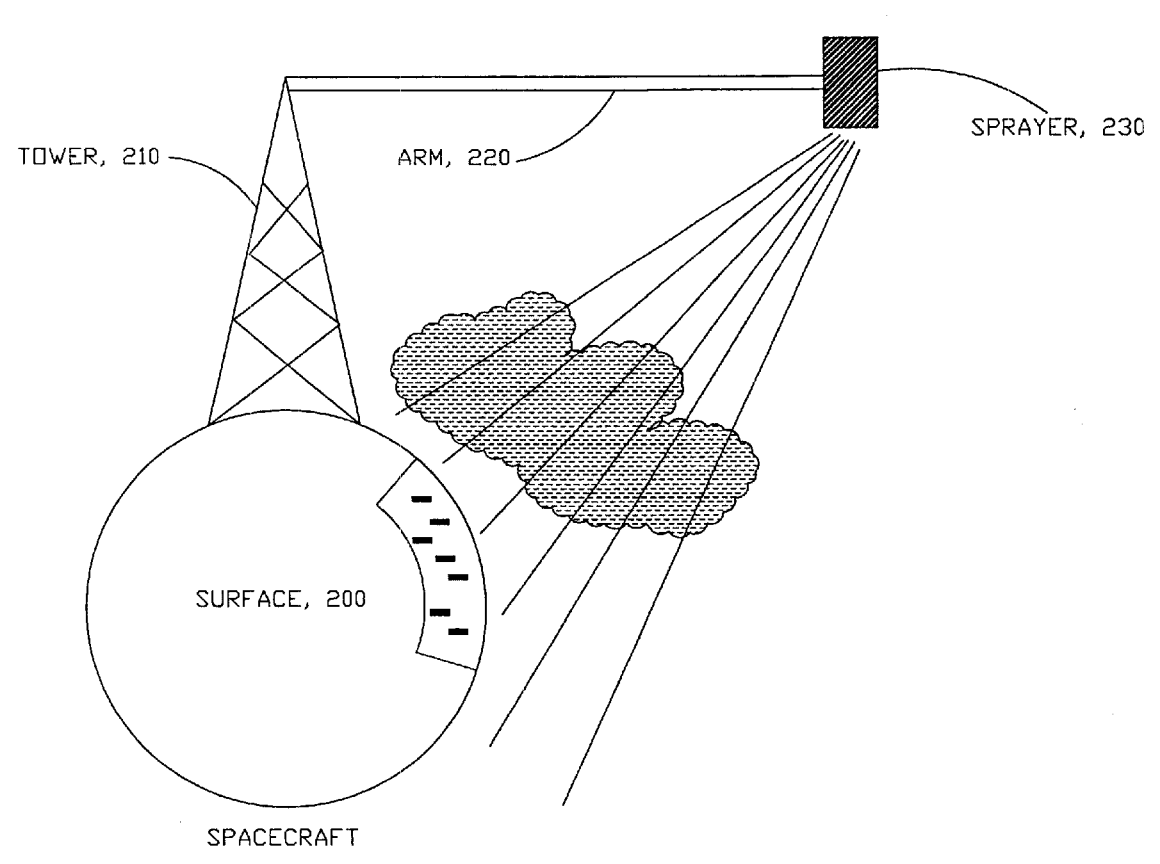

The present invention consists of a concept of using polar molecules to mitigate spacecraft surface charging. A schematic engineering design for this purpose in FIGS. 1 and 2 consists of a polar-molecule liquid container 120, a tower 210 with a movable arm 220, heaters 140 and 110, and an atomizer sprayer 230. The container 120 is an ordinary space-qualified container, the heaters 140 and 110 are ordinary electrical coils capable of heating the liquid to nearly its boiling temperature, the tower 210 is about 2 meters tall extending out from the spacecraft surface, and the atomizer sprayer 100 is capable of spaying a fine mist of tiny liquid droplets.

A schematic drawing of the invention is shown in FIG. 1. A polar molecule liquid is stored in a container 120. A heating coil 140 is inside. The heating coil 140 is capable of heating the liquid to temperatures near boiling. The liquid flows along a tube through a control knob 130 to the atomizer sprayer 100, which is mounted on a movable arm 220 on a tower 210. The lengths of the towers and arms equal the radius of the spacecraft 200 approximately.

To operate the device, the movable arm 220 moves into a desired position to aim the polar liquid vapor/droplet spray onto a charged spacecraft surface 200. The vapor/droplets are neutral initially. There the droplets act as electron scavengers and become negatively charged droplets. As they evaporate to small sizes, they eventually burst into smaller droplets taking the electrons away.

The control knob 130 can be switched on or off by a remote command from the ground.

When the negative charging level of the spacecraft or a spacecraft surface reaches a certain level, the ground command can optionally turn the mitigation device on. When the level falls to a certain level, the ground command can optionally turn the mitigation device off. Alternatively, it can be turned on or off automatically by linking it to a charging sensor. When the sensor senses a critical charging level, it can send a command to turn on or off the device automatically.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A process for mitigation of spacecraft surface charging using polar molecules, said process comprising the steps of:

spraying a neutral polar molecular liquid at an exospace altitude in a mist onto negatively charged spacecraft surfaces; and allowing molecules of the mist to pick up electrons and evaporate away with the electrons.

2. A process, as defined in claim 1 wherein the neutral polar molecular liquid comprises polar molecules selected from the group consisting of $CCl_4$, $SF_6$, $C_2HCl_2$, $C_2H_4Cl_2$, and $C_2HCl_3F_2$.

* * * * *